United States Patent [19]

Geffroy et al.

[11] Patent Number: 4,491,717
[45] Date of Patent: Jan. 1, 1985

[54] RADIATION-TIGHT COUPLING ARRANGEMENT FOR A MACHINING LASER

[75] Inventors: Jean Geffroy, Versailles; Charles Glachet, Vendome; Maurice Moulin, Palaiseau; Jean P. Noel, Chatenay Malabry, all of France

[73] Assignee: Commissariat a l'Energie Atomique, Paris, France

[21] Appl. No.: 342,885

[22] Filed: Jan. 26, 1982

[30] Foreign Application Priority Data

Jan. 30, 1981 [FR] France .................. 81 01810

[51] Int. Cl.³ .............................................. B23K 27/00
[52] U.S. Cl. ...................... 219/121 LG; 219/121 LN; 219/121 FS; 252/627; 252/647
[58] Field of Search ................. 219/121 LC, 121 LD, 219/121 LG, 121 LN, 121 LU, 121 LV, 121 FS; 252/627, 647

[56] References Cited

U.S. PATENT DOCUMENTS

| | | | |
|---|---|---|---|
| 2,874,107 | 2/1958 | Ohlinger | 204/193.2 |
| 3,569,993 | 3/1971 | Blin | 219/121 |
| 4,317,021 | 2/1982 | Walch et al. | 219/121 LG |

FOREIGN PATENT DOCUMENTS

| | | |
|---|---|---|
| 1219406 | 12/1959 | France . |
| 1328141 | 4/1963 | France . |
| 2040616 | 1/1971 | France . |
| 2237,280 | 2/1975 | France . |
| 1009000 | 11/1965 | United Kingdom . |
| 1215714 | 12/1970 | United Kingdom . |

*Primary Examiner*—C. L. Albritton
*Attorney, Agent, or Firm*—Michael N. Meller

[57] ABSTRACT

A radiation-tight coupling arrangement for coupling a machining laser to a hot cell containing radioactive material, comprising a cell flange integrally formed on the confinement wall which defines a cell opening, a cell door formed to interlock tightly with the cell flange, thereby closing the cell opening, an elongated container movably arranged in the sleeve and having a container flange defining a container opening and connected by a sealing bellows, a container door formed to interlock tightly with the container flange and to interlock with the cell door when the container flange interlocks with the cell flange, and a machining line translationally arranged in the container. When the container is in a retracted position, a radiation blocking drum intervenes between the cell opening and the container opening. The radiation blocking drum is rotated to allow the container to translate toward the cell. As a result of rotation of the container, the container flange interlocks with the cell flange and the container door interlocks with the cell door. The container door and cell door are then removed in tandem, allowing the machine head of the machining line to be inserted into the hot cell. The laser beam passes through the machine head and impinges on the radioactive material to be cut.

13 Claims, 4 Drawing Figures

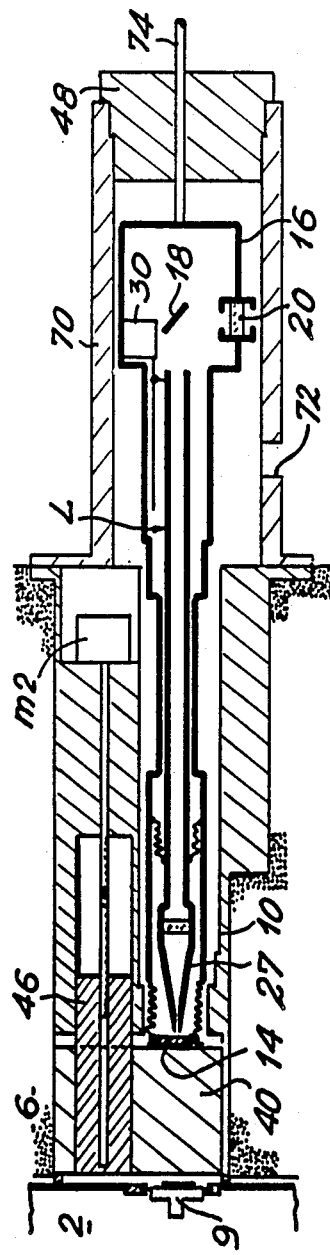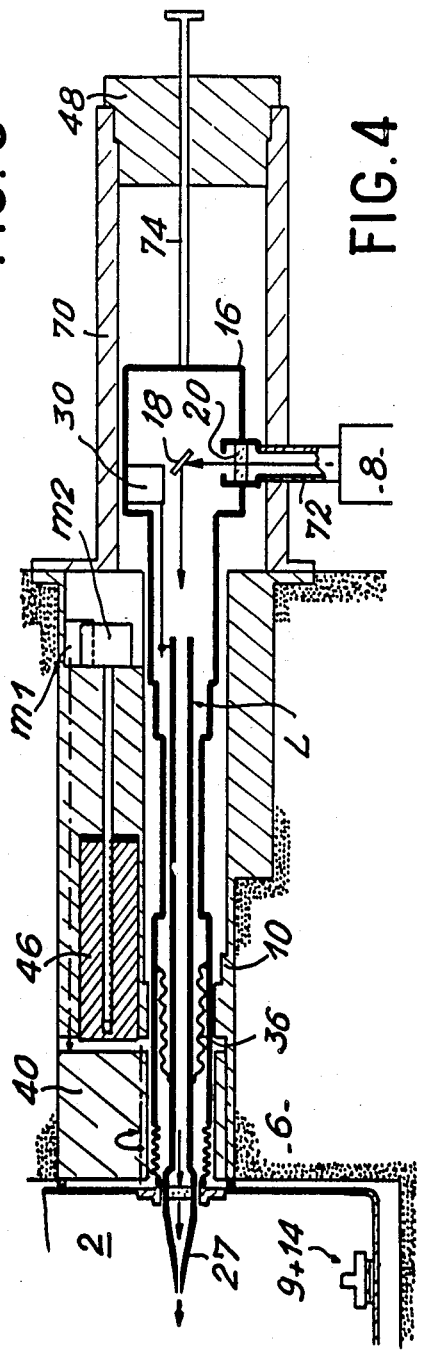

RADIATION-TIGHT COUPLING ARRANGEMENT FOR A MACHINING LASER

FIELD OF THE INVENTION

The present invention relates to a radiation tight coupling arrangement for coupling a machining laser to a hot cell containing radioactive material. It also relates to a process for the use of the coupling arrangement.

BACKGROUND OF THE INVENTION laser beam machining installation comprises a laser and a machining head (also called "nozzle") located in the vicinity of the part to be machined and which focuses the laser beam.

As is known, the power density supplied by continuous $CO_2$ lasers makes it possible to achieve the melting or volatilization temperature of any random material by simply focusing the laser beam. Thus, in addition to other applications, laser beams make it possible to perform machining processes without introducing impurities into the material to be machined or welded. Laser beam cutting processes are also particularly well adapted to the cutting and volume reduction problems occurring in a hot cell of metal parts, such as the assembly structures of nuclear fuel elements.

In the presently known welding or cutting installations, like those described for example in the article by P. R. Higginson and D. A. Campbell, "Dounreay Nuclear Power Development Establishment", the actual laser is located outside the hot enclosure and the machining head positioned within the cell focuses the laser beam onto the part to be cut. The machining head remains within the cell. Moreover, this document describes no radiation-tight sealing to ensure the confinement of radiation to the enclosure and no means are disclosed for the purpose of cooling windows or lenses placed in the path of the lser beam.

The behavior of the focussing lens of the machining head is one of the essential features occurring in an installation of this type. Thus, the machining head located within the hot cell is permanently exposed to the radiation inside the cell. Thus, under the action of this radiation, the lens becomes progressively opaque. Therefore, when traversed by the laser beam, the lens absorbs a quantity of heat, which increases as the lens becomes more opaque. The lens cooling means, provided as a function of the power of the laser beam will then become inadequate for cooling the lens. The lens becomes excessively hot leading to its fracture.

In known cutting installations, this problem has hitherto been solved by replacing the machining head after a relatively short operating period.

SUMMARY OF THE INVENTION

The present invention provides a solution for this problem and, as a result, considerably increases te service life of the machining head and, in particular, the focussing lens by preventing the exposure thereof to the radiation of the hot cell when laser beam machining and is not in progress. The machining head is moved back behind a radiation blocking means which protects the head from the radiation. Thus, the head is only exposed to radiation when in the working position and consequently its life is considerably increased.

In addition, the container constitutes a radiation tight system, which can easily be removed and replaced. Therefore, its complete outer surface area is free from contamination. The outer wall of the container is protected from contamination by the bellows connecting the wall to the container flange. Moreover, when the machining head is in the working position, the two doors, namely the cell door, and the container door remain coupled to one another. They are only separated after locking the cell door to the cell flange of the hot cell confinement wall. As of this time, the confronting faces are protected from contamination, so that they are permanently contamination-free.

It is true that the contaminated atmosphere of the cell enters the spaces defined by the interior of the end of the container and the interior of the machining head during the machining operation. However, this contamination is confined within the container and cannot contaminate the outer walls. Thus, the outer walls remain completely free from contamination. The container can easily be removed and replaced, whilst using adequate radiation protection means.

The present invention relates to a radiation tight coupling arrangement for coupling a machining laser to a hot cell containing radioactive material according to which the machining head can be entirely retracted behind a radiation blocking means when not in use.

According to the invention, the machining head is fitted at the end of a tube, which can slide within a protective container. The container can move in translation and rotation within a sleeve and can be sealingly engaged on a cell flange integrally formed with the confinement wall of the hot cell. When the machining head is retracted into the container, the latter, after unlocking, can be drawn back into the sleeve, which makes it possible to position a radiation blocking drum between the cell and the machining line.

Sealing with respect to the cell atmosphere is brought about by means of a bellows placed between the tube and the container, as well as by a focussing element sealingly fixed within the tube.

More specifically, this coupling arrangement comprises:

a sleeve joined to the thick radiation blocking wall surrounding the cell, a cell flange integrally formed with the cell and a cell door formed to tightly interlock the cell flange, the latter defining a cell opening facing the sleeve, a radiation tight container having a generally elongated shape positioned within the sleeve, the container end directed towards the cell wall being provided with a container flange connected by a sealing bellows, a container door formed to tightly interlock the container flange, the latter defining a container opening, means for displacing the container in translation and rotation within the sleeve, a machining line located within the container, means for the displacement in translation within the container of the machining line, radiation blocking means can be placed between the cell and the container when the latter is in the retracted position.

The invention also relates to a process for the use of the coupling arrangement according to the present invention.

This process is characterized in that:

the radiation blocking means between the cell and the container are rotated out of the way, a translation of the container takes place until the container flange engages the cell flange, the container is rotated to simultaneously lock the container flange on the cell flange and the container door on the cell door and at the same time the container door is unlocked from the container flange, from the interior of the cell the assembly constituted by the cell door and the container door is removed and deposited, and there is a translation of the tube relative to the container enabling the machining head to penetrate the cell.

BRIEF DESCRIPTION OF THE DRAWINGS

The invention is described in greater detail hereinafter with reference to non-limitative embodiments and the attached drawings, wherein:

FIGS. 3 and 4 are sectional views of the coupling element in the retracted and forward positions, respectively.

DESCRIPTION OF THE PREFERRED EMBODIMENTS

Figure 1:
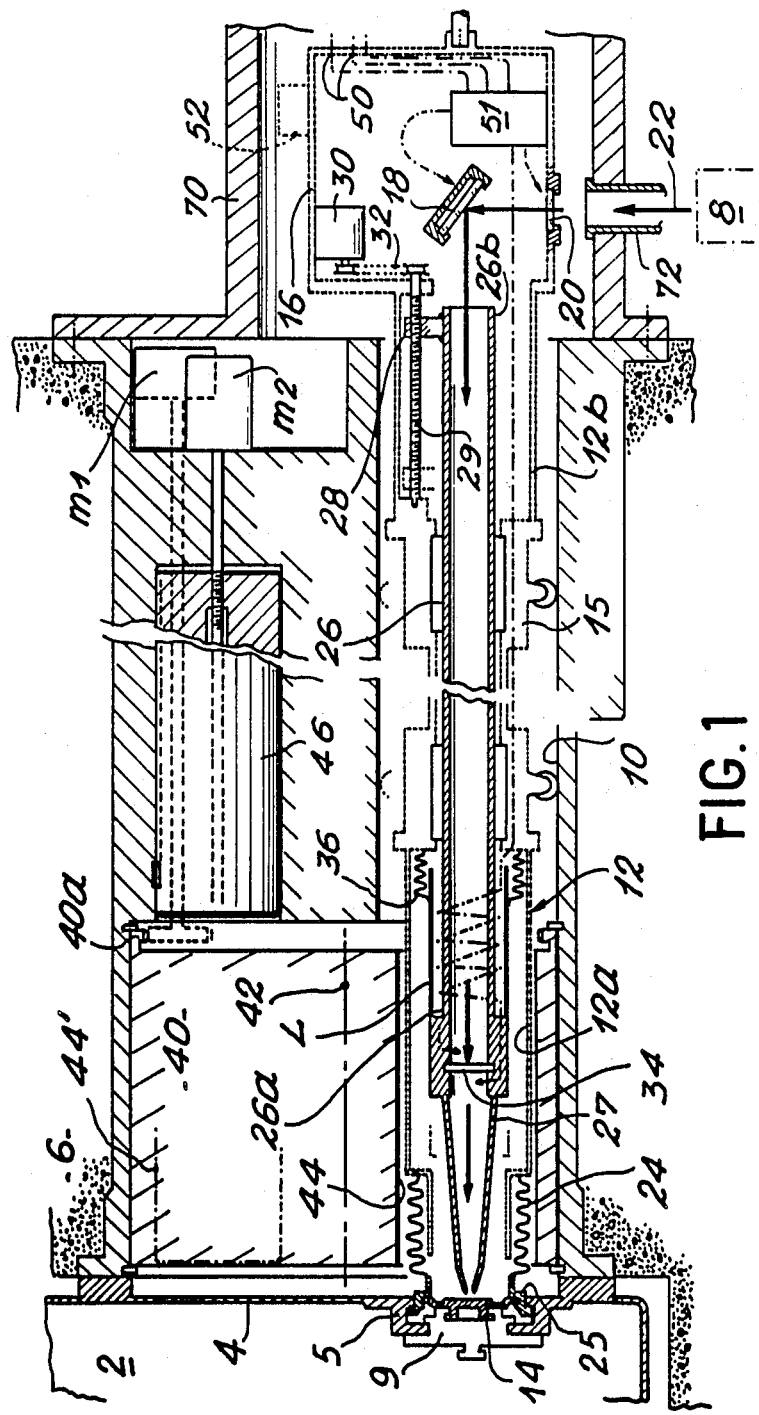
FIG. 1 is a sectional view of the radiation-tight coupling arrangement according to the invention.

In FIG. 1, reference numeral 2 designates a cell in which radioactive products can be processed. The interior of cell 2 is defined by a confinement wall 4. A thick concrete wall 6 provides protection against the radiation of the radioactive medium contained in cell 2.

As stated hereinbefore, laser beam cutting processes are well suited to solving the problems of cutting and volume reduction of materials, in particular those materials used in the assembly structures of nuclear reactor fuel elements which would be contained in an enclosure such as cell 2 during the manufacturing process.

The present invention relates to the passage of a laser beam through walls 4 and 6 so as to permit the machining of materials contained within the hot cell 2 by a machining laser 8 located outside the cell 2. The machining head can be retracted behind a radiation protection drum 40 when not in use.

A cylindrical metal sleeve 10, sealingly connected to the confinement wall 4, traverses concrete wall 6. A tight door 9, hereinafter called the cell door, is fitted to the cell flange 5 integral with confinement wall 4, making it possible to block or allow communication with the interior of the cell 2. Container 12 is located within sleeve 10 and can carry out translational and rotational movements with respect to sleeve 10 by means of roller bearings, which are known per se and therefore are not described in detail.

A sealing bellows 24 is sealingly connected to a container flange 25 and to the container end 12a which is directed towards the interior of hot cell 2 and which will hereinafter be referred to as the "inner end of the container". A tight door 14, hereinafter called the container door, is mounted on the container flange 25. Flange 25 can be sealingly fitted to the confinement wall 4 by locking as a result of rotating the flange 25. When locking has taken place, the cell door 9 and container door 14 are joined together in such a way that they can be removed together from the inside of the cell, e.g. usig a remote manipulator.

Devices making it possible to lock together two tight enclosures, such as cell 2 and container 12, and to transfer a part from one into the other without radiation leakage form part of the prior art. These radiation-tight double-door transfer devices can be used for connecting a container to an enclosure without contamination of the confronting faces of the doors or any escape of the atmosphere within the cell to the outside.

The radiation-tight transfer of the machining nozzle 27 from the container to the cell takes place by initially locking the container to the cell and then by locking the two doors together. The double door can then be opened using gloves or a remote manipulator, so that transfer can take place without any break of the seal between the cell and container.

A radiation-tight double-door transfer device functions in the following way. With the container and cell closed, the container is moved forward and rotated by 60° in the clockwise direction. A first hard point is felt when the container door abuts the cell door and there is a second hard point when the two doors are unlocked. The two doors are then removed together by means of gloves or a remote manipulator. Transfer takes place and the double door is replaced. A two-step rotation takes place, which disconnects the two doors, locks the container door to the container flange, and unlocks the container flange from the cell flange. Thus, the container and cell are again separately sealed.

At its other end 12b, container 12 has a sealingly fixed box 16, which contains a plane deviating mirror 18. Box 16 has a confinement window 20 by which the beam 22 of laser 8 enters box 16 to be reflected by the plane mirror 18. It is pointed out that when the container door 14 is closed, container 12 defines a completely radiation-tight space within which contamination can be confined.

Within container 12 there is a tube 26 which can be translated relative to the container along the longitudinal axis of the tube. For example, this translation is brought about by a screw—nut system, 28, 29. Screw 29 is rotated by motor 30 by means of a belt 32. Thus, there is a longitudinal translation of tube 26 relative to container 12. A sealing bellows 36 is sealingly connected to tube 26 and container 12.

Tube 26 carries a lens 34 at its end 26a which is directed towards the cell. This lens serves to close end 26a of the tube and focus the laser beam. The lens is made from zinc selenide and has a focal length suitable for the work to be carried out. A machining head 27, whose length is a function of the focal length of the lens 34 is fixed by screws to the end 26a of tube 26. The other end 26b of tube 26 is open. Tube 26 and head 27 constitute the machining line L. Lens 34 and machining head 27 can be maintained outside the active cell in a glove box.

A drum 40, which rotates about its axis 42 provides protection against $\gamma$(gamma) radiation when the machining line is in the retracted position. This drum has a cylindrical opening 44, which is adequate to allow the passage of container 12 when the drum is in the open position as shown in FIG. 1. When the machining line is retracted, a motor $m_1$ pivots drum 40 by 180° about axis 42 by means of a spur ring 40a. Motor $m_2$ then moves cylinder 26 into opening 44, which is then in position 44' indicated by dot-dash lines in FIG. 1.

When the drum 40 is in the open position, an external plug 48 (visible in FIGS. 3 and 4) provides a complementary protection against $\gamma$(gamma) radiation.

The power transmitted by the laser beam 22 is such that it is necessary to cool the window 20, focussing lens 34, and plane mirror 18. Thus, the device according to the invention is equipped with cooling gas supply ducts 50 connected to the distribution box 51. Furthermore, a filter 52 is provided on the box for the discharge of the cooling gases. The cooling gases flow along the faces of window 20, focussing lens 34, and plane mirror 18. The cooling device for the optical components is shown on a larger scale in FIG. 2.

Figure 2:
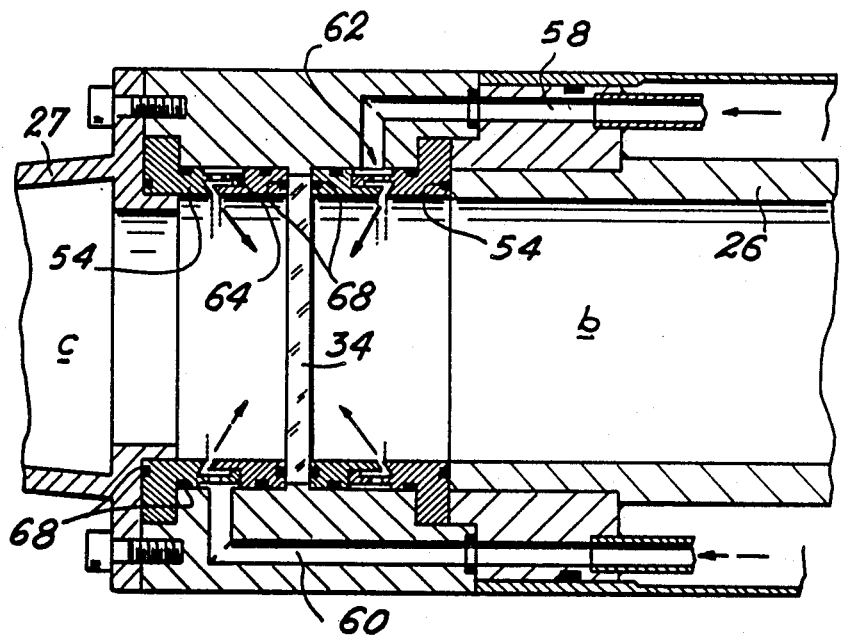
FIG. 2 is a detailed sectional view of the transmissive optical element and the cooling gas ducts arranged in the tube.

FIG. 2 is a detailed view of the modular element comprising lens 34. This modular element separates the cold and hot confinement zones b and c respectively. In place of lens 34, the modular element can be equipped with a confinement window made of material such as ZnSe-AsGa-NaCl, that is able to transmit the infra-red with low energy absorption.

As stated hereinbefore, the high power levels transmitted make it necessary to cool elements 20 and 34 traversed by the laser beam. This is brought about by gas flows along the faces thereof. The gas used is generally the same as that of the cell, i.e., dry filtered nitrogen. The cooling gas also dynamically confines the contamination. The pressure in cold zone b is higher than that in zone c. Thus, in the case of a leak, gas flows from the cold zone to the hot zone without contaminating the interior of tube 26.

The cooling gas can also have a complementary function. In the case where the laser beam is used for cutting purposes, it is possible to use oxygen as the cooling gas for the face of lens 34 which confronts machining head 27. This oxygen supplies a power additional to that of the laser beam by an exothermic reaction of the materials to be cut. The gas quantities required are low compared with the volume of the cell and have no effect on the atmosphere thereof.

In the case of a welding operation, the cooling gas can be helium or a neutral gas. The cooling gases are supplied by ducts 58 and 60 issuing into annular chambers 62, 64 made in rings 54. Annular slots issue in the vicinity of the focussing element 34 and are directed towards the latter, thereby distributing the cooling gas over the entire surface of its faces.

A system of joints 68 ensures the necessary seals beween the machining head 25 and the first ring 54, between the second ring 54 and tube 26, and between the focussing element 34 and both rings 54.

FIGS. 3 and 4 illustrate the operation of a radiation-tight coupling according to the invention and as described with reference to FIGS. 1 and 2. The machining line L is shown in the retracted position in FIG. 3. In this position, drum 40 is in the closed position, i.e. its opening 44 does not face the machining line and is in fact located 180° from the facing position as measured relative to the axis of rotation of the drum 40. Motor $m_1$ enables drum 40 to be moved from the open position to the closed position. Moreover, a supplementary protective cylinder 46 is introduced under the control of motor $m_2$ and a screw-nut system. Thus, complete protection against γ(gamma) radiation is ensured for locations external to cell 2. The cell door 9 is shown closed in FIG. 3. It is also pointed out that the external shield 70 and plug 48 provide protection against γ(gamma) radiation, when drum 40 is in the open position. Shield 70 has an opening 72 through which the laser beam 22 passes (see FIG. 1). As line L is in the retracted position in FIG. 3, opening 72 does not face window 20. Diagrammatically represented means 74 make it possible to tightly control the translation of line L.

FIG. 4 shows machining line L in its forward position with the machining nozzle 27 extending into cell 2. From the positions shown in FIG. 3, cylinder 46 is moved back by means of motor $m_2$ and then drum 40 is rotated to the open position by means of motor $m_1$, the cell door 9 remaining in the closed position. When using control rod 74, the complete line L is translated so as to bring the container door 14 into contact with cell door 9. The container door is then locked on the cell door by a 90° rotation. A seal is provided between the cell flange 5 and the container flange 25 as a result of this rotation. Cell door 9 is then unlocked by means of a jack. The cell door is then opened either by means of a remote manipulator, or by means of a second jack, the container door 14 remaining fixed to the cell door 9. When the two doors have been removed, a seal is maintained by means of bellows 24 connecting the container flange 25 to container 12. Although the radioactive medium can penetrate the interior of the end 12a of container 12, contamination is confined by sealing bellows 36 and by focussing element 34. If focussing element 34 breaks, there is a second confinement barrier constituted by the wall of container 12 and by confinement window 20. This is an important feature because lens 34 is exposed to radiation during its operation and becomes progressively opaque under the effect of this radiation. This leads to increased heating of the lens which may ultimately result in fracture.

The machining head penetrates the interior of the hot cell 2. The translation of the machining head is ensured by motor 30 and the screw-nut system 28, 29, which permits the displacement of tube 26, on the end of which the head is fixed.

As can be seen in FIG. 4, the translation of line L brings the window 20 into a facing position with respect to opening 72 in the external shield 70. The laser can then be put into operation.

The retraction of the machining head takes place in the reverse order. The cutting head is firstly retracted into container 12 by means of motor 30. The container coor and cell door assembly is then re-installed, either by means of a remote manipulator or by means of a jack. Cell door 9 is locked to cell flange 5 by means of a rotary bolt controlled by a jack.

The rotation of line L, which is manipulated by rod 74, joins container door 14 to flange 25 of container 12, which is then tightened. Container door 14 is then disengaged from cell door 9.

Rod 74 can be manipulated to translate line L away from cell 2, thereby allowing drum 40 to be rotated 180° by motor $m_1$ and then sealed by sliding plug 46 towards the cell 2 by means of motor $m_2$ and the screw-nut device associated therewith.

What is claimed is:

1. A radiation-tight coupling arrangement for coupling a machining laser to a hot cell containing radioactive material, comprising:
    (a) a confinement wall defining said hot cell and having a cell opening defined by a cell flange means formed integrally with said confinement wall;
    (b) a cell door formed to interlock with said cell flange means for closing said cell opening;
    (c) a sleeve having one end rigidly affixed to said confinement wall such that said cell opening faces the internal volume defined by said sleeve;
    (d) a radiation-blocking wall formed to surround said confinement wall except for the internal volume defined by said sleeve, said radiation-blocking wall being joined to the circumferential surface of said sleeve;

(e) an elongated container movably arranged in said sleeve and having a first sealing bellows connected to a container flange means, said container flange means defining a container opening and being formed to interlock with said cell flange means;

(f) a container door formed to interlock with said container flange means for closing said container opening and formed to interlock with said cell door;

(g) means for rotating and translating said container about and along its longitudinal axis, respectively; said container being translatable between a forward position and a retracted position;

(h) a machining line translatably arranged in said container, said machining line having a machining head;

(i) means for translating said machining line along the longitudinal axis of said container;

(j) means for removing said cell door from interlocking relationship with said cell flange means, thereby uncovering said cell opening;

(k) a first radiation blocking means rotatably arranged in said sleeve and capable of occupying a first position between said cell opening and said container opening when said container is in said retracted position; and (l) means for rotating said first radiation blocking means; wherein when said container occupies said forward position, said container flange means is capable of being interlocked with said cell flange means by manipulation of said means for rotating said container, said container door being interlocked with said cell door as a result of said manipulation such that said container door is removed from interlocking relationship with said container flange means when said cell door is removed from interlocking relationship with said cell flange means, and said machining head enters said hot cell by way of said container opening and said cell opening when said machining line is translated in the direction of said hot cell.

2. A coupling arrangement as claimed in claim 1, wherein said first radiation blocking means comprises a drum having an axis of rotation substantially aligned with the axis of translation of said container and having an opening disposed substantially parallel to but displaced radially from said axis of rotation, said opening being aligned to allow passage of said container when said drum occupies a second position, said second position being reached by a rotation of said drum of substantially 180° from said first position.

3. A coupling arrangement as claimed in claim 1, wherein said machining line further comprises a tube, the end of said tube closest to said hot cell being provided with a transmissive optical element, and said machining head being integrally formed with said end of said tube.

4. A coupling arrangement as claimed in claim 3, wherein said transmissive optical element comprises a focussing lens.

5. A coupling arrangement as claimed in claim 1, further comprising an external shield rigidly attached to the other end of said sleeve, and a second radiation blocking means removably attached to said external shield, wherein said second radiation blocking means has an opening in which said means for rotating and translating said container is slidably and rotatably arranged.

6. A coupling arrangement as claimed in claim 1, further comprising a second sealing bellows which is sealingly connected to said container and to said machining line.

7. A coupling arrangement as claimed in claim 4, further comprising a plane mirror arranged in said container for reflecting the laser beam produced by said machining laser toward said machining head, said container comprising a confinement window through which said laser beam is received.

8. A coupling arrangement as claimed in claim 7, further comprising a source of cooling gas and means for directing cooling gas onto said focussing lens, said confinement window, and said plane mirror.

9. A coupling arrangement as claimed in claim 8, wherein said cooling gas is different from the gas in said hot cell.

10. A coupling arrangement as claimed in claim 8, further comprising ducts along which said cooling gas is transported from said source of cooling gas to said focussing lens, said confinement window and said plane mirror.

11. A coupling arrangement as claimed in claim 8, further comprising a gas discharge filter affixed to said container at a gas discharge outlet formed in said container.

12. A coupling arrangement as claimed in claim 10, wherein said ducts comprise channels formed in said tube such that cooling gas is supplied to both sides of said focussing lens.

13. A method for operating a radiation-tight coupling arrangement for coupling a machining laser to a hot cell containing radioactive material, comprising the steps of:

(a) rotating a radiation blocking drum from its position between the opening of a hot cell and the opening of a movable elongated container;

(b) translating said container from its retracted position to its forward position where a container flange means engages a cell flange means;

(c) rotating said container, thereby interlocking said container flange means with said cell flange means and interlocking a container door with a cell door;

(d) removing said interlocked cell door and container door in tandem and depositing them within said cell; and (e) translating a machining line arranged in said container toward said cell, thereby inserting a machining head through said container opening and said cell opening and into said cell.

* * * * *